United States Patent [19]

Shepodd et al.

[11] Patent Number: 5,624,598
[45] Date of Patent: Apr. 29, 1997

[54] MATERIALS FOR THE SCAVANGING OF HYDROGEN AT HIGH TEMPERATURES

[76] Inventors: Timothy J. Shepodd, 330 Thrasher Ave., Livermore, Alameda County, Calif. 94550; Bradley L. Phillip, 20976 Fairmount Blvd., Shaker Heights, Cuyahoga County, Ohio 44120

[21] Appl. No.: 424,775

[22] Filed: Apr. 18, 1995

[51] Int. Cl.$^6$ .................................................. C09K 3/00
[52] U.S. Cl. ........................... 252/182.12; 252/181.1
[58] Field of Search ........................... 252/181.1, 182.12

[56] References Cited

U.S. PATENT DOCUMENTS

| | | | |
|---|---|---|---|
| 1,140,633 | 5/1915 | Trucano | 285/47 |
| 3,397,745 | 8/1968 | Owens et al. | 166/57 |
| 3,720,267 | 3/1973 | Allen et al. | 166/314 |
| 3,763,935 | 10/1973 | Perkins | 166/315 |
| 3,896,042 | 7/1975 | Anderson et al. | 252/184 |
| 3,963,826 | 6/1976 | Anderson et al. | 423/248 |
| 4,043,387 | 8/1977 | Lamp | 165/105 |
| 4,405,487 | 9/1983 | Harrah et al. | 252/194 |
| 4,512,721 | 4/1985 | Ayers et al. | 417/51 |
| 4,546,798 | 10/1985 | Porta | 138/140 |
| 4,886,048 | 12/1989 | Labaton et al. | 165/104.27 |

OTHER PUBLICATIONS

Fieser, L. & Fieser, M.; Textbook of Organic Chemistry; 1950; pp 66–69 & p. 86.

Roni et al.; Kawasaki Steel Tech. Report; Jun. 1987; pp. 71–76.

Haoens, S. et al.; J. Sci. Polymer Chem. Ed.; 1981; p. 1349.

*Primary Examiner*—Charles T. Jordan
*Assistant Examiner*—Anthony R. Chi
*Attorney, Agent, or Firm*—Timothy D. Stanley; Gregory A. Cone; Donald A. Nissen

[57] ABSTRACT

A hydrogen getter composition comprising a double or triple bonded hydrocarbon with a high melting point useful for removing hydrogen gas, to partial pressures below 0.01 torr, from enclosed spaces and particularly from vessels used for transporting or containing fluids at elevated temperatures. The hydrogen getter compostions disclosed herein and their reaction products will neither melt nor char at temperatures in excess of 100C. They possess significant advantages over conventional hydrogen getters, namely low risk of fire or explosion, no requirement for high temperature activation or operation, the ability to absorb hydrogen even in the presence of contaminants such as water, water vapor, common atmospheric gases and oil mists and are designed to be disposed within the confines of the apparatus. These getter materials can be mixed with binders, such as fluropolymers, which permit the getter material to be fabricated into useful shapes and/or impart desirable properties such as water repellency or impermeability to various gases.

11 Claims, 2 Drawing Sheets

MATERIALS FOR THE SCAVANGING OF HYDROGEN AT HIGH TEMPERATURES

STATEMENT OF GOVERNMENT INTEREST

This invention was made with Government support under contract no. DE-AC04-94AL8500 awarded by the U.S. Department of Energy to Sandia Corporation for the management and operation of Sandia National Laboratories. The Government has certain rights in the invention.

BACKGROUND OF THE INVENTION

The present invention relates generally to a method of preventing the accumulation of hydrogen gas in enclosed spaces at elevated temperatures and particularly to the use of organic compounds, combined with catalysts, as hydrogen getters at elevated temperatures.

There are numerous industrial operations that require the movement of high temperature fluids from one location to another such as heat pipes, thermosyphons or the tubulars used in oil fields, petrochemical plants, air separation plants and solar collectors to transport heated gases or liquids over long distances. Because of the elevated temperatures as well as other physical constraints inherent in these operations metal tubes or pipes must be used. As a consequence of the outgassing or corrosion of these metal components and thermal decomposition of the fluids transported therein, hydrogen may be formed and accumulate with deleterious effect.

In the case of tubulars and other insulated devices, in order to maintain the temperature of the fluid being transported the annular space between the coaxial inner and outer tubes can be filled with an insulating material. These insulating materials may be air or other gases or preferably insulating fibers, powders, foams or radiative heat shields. Significant improvements in thermal efficiency can be achieved by evacuating the annular space. However, the accumulation of corrosion products, particularly high conductivity gases, in the annulus causes the thermal insulating properties of these insulated tubulars to degrade over time.

Hydrogen, produced either by corrosion reactions between the fluid or gases, or constituents thereof, flowing in the pipes or tubes or diffusing in from the outside, is, because of its very high thermal conductivity, a particular problem. The degree to which hydrogen accumulation in an insulated tubular can degrade thermal insulating performance is well known. It has been estimated that partial pressures of hydrogen above 0.01 torr begin to degrade thermal insulating efficiency. The thermal conductivity of oil field tubulars utilizing an inert gas in the insulating annulus has been known to increase by a factor of from 5-8 times over the initial values in as little as a year of service due to accumulation of hydrogen. J. Roni et al. in "Insulated Tubular in Steam Injection", Kawasaki Steel Technical Report, No. 16, June 1987, pp. 74-76 show that the thermal conductivity of a vacuum insulated tubular can increase by a factor of 50 if contaminated with hydrogen.

A heat pipe works on the principle of a reflux boiler and is extremely efficient in terms of transferring large thermal fluxes. In its conventional form, the heat pipe is a closed tube in which a vaporizable fluid transfers heat from an evaporation zone to a condensation zone. Particular care is taken in the design and selection of materials of construction of heat pipes to prevent the formation of non-condensable gases in the pipe interior. Non-condensable gases, such as hydrogen, can inactivate a significant portion of a heat pipe and reducing and/or eliminating their formation from heat pipes has long been known to be of critical importance. Although hydrogen gas formation can be prevented by the proper selection of compatible containment and fluid materials, economic considerations often dictate the use of low cost materials such as carbon steel and water which generate hydrogen more rapidly.

The operating life of a lamps, either incandescent or pressured discharge lamps, can be greatly affected by the presence of certain gases in the internal lamp atmosphere. Water vapor is particularly harmful because even trace amounts can cause the evaporation and redeposition in cooler parts of the lamp of various metallic components by a process known as the "water cycle". In an incandescent lamp, for example, the temperature of the tungsten coil is sufficient to decompose water vapor into hydrogen and oxygen. The resulting oxygen reacts with tungsten in the coil to form volatile oxides which migrate to cooler parts of the lamp and condense, principally on the glass envelope. These oxide deposits are reduced by hydrogen to yield black metallic tungsten and reformed water, allowing the cycle to repeat. Removing the hydrogen formed from thermal decomposition of water vapor inside lamps by means of a hydrogen getter will prolong the useful life of the lamp. In some lamp applications, Zr-Al getters are used to remove hydrogen, however, these materials require a temperature in the range of 300–400C. in order to operate efficiently.

It has long been known that hydrogen absorbing materials, known as getters, can be used to counteract hydrogen accumulation. The use of conventional hydrogen getter materials in insulated tubulars containing low thermal conductivity gases to prolong the insulating properties of insulated tubulars has been described by Perkins in U.S. Pat. No. 3,763,935. Allen et al. discuss the use of hydrogen getters for vacuum insulated tubulars in U.S. Pat. No. 3,720,267. Ayers et al. discuss the use of active metals such as zirconium or titanium, and alloys thereof, for maintaining a vacuum in the annular space in tubulars used to inject steam into an oil well in U.S. Pat. No. 4,512,721. These metals are capable of maintaining low hydrogen partial pressures but have the disadvantage of requiring high temperatures for initial activation and/or ongoing operation because of the necessity to diffuse surface contaminants into the bulk metal thereby providing a fresh surface for continued hydrogen absorption.

Another means for removing hydrogen involves reacting the hydrogen with oxygen to form water, in the presence of a noble metal catalyst such as palladium, and trapping the water on a water absorbing material such as a molecular sieve. Labaton, in U.S. Pat. No. 4,886,048, describes the use of palladium membranes to selectively remove hydrogen from vacuum insulation jackets such as those used in evacuated solar energy collectors where the source of hydrogen is the thermal decomposition of a heat transfer fluid and where a high temperature oxidizing atmosphere is available.

The conventional hydrogen getters described in the above-referenced patents are expensive, may require special operating conditions such as high temperature regimes or ancillary reactants in order to maintain low hydrogen partial pressures, generally will not work well or at all in the presence of water and/or oxygen and may pose significant safety hazards, including fire and explosion if handled improperly, for example exposure to air. Although many hydrogen getter materials have been described and used in the past, particularly for insulated tubulars, this invention discloses a new material for removing hydrogen which has significant advantages over existing getter materials.

It is well known in the art that unsaturated carbon-carbon bonds can be reduced by hydrogen in the presence of an appropriate catalyst to form an alkane (see, for example, Fieset, L. F. and Fieser, M., *Textbook Of Organic Chemistry*, D. C. Heath & Co. 1950, pp. 66–69 and 86). This reaction makes possible the hydrogen getters of the present invention. In these getter systems an organic compound containing an unsaturated carbon-carbon bond, preferably an acetylenic compound, is mixed with a hydrogenation catalyst, typically a metal selected from group VIII of the Periodic Table, preferably palladium, platinum or rhodium, although other catalysts are possible, ibid. When exposed to hydrogen, the organic reactant compound is irreversibly converted to its hydrogenated analog with the aid of the associated catalyst, consequently the reaction can be carried out in a vacuum and is unaffected by the presence of normal atmospheric gases or water.

SUMMARY OF THE INVENTION

The invention disclosed herein provides a new solution to the problem of maintaining low hydrogen partial pressures in enclosed spaces at elevated temperatures thereby preventing the loss of performance, particularly in heat transfer devices and piping in contact with high temperature fluids. The organic hydrogen getter systems disclosed herein have significant advantages over conventional hydrogen getter systems namely, low risk of fire or explosion, no requirement for high temperature activation or operation, the ability to absorb hydrogen even in the presence of contaminants such as common atmospheric gases, water, water vapor and oil mists and no requirement for the presence of ancillary gases, e.g., oxygen.

Accordingly, it is an object of this invention to provide a means for efficiently removing hydrogen from enclosed spaces at elevated temperatures, typically in excess of 100C. Another object is to remove hydrogen from enclosed spaces where the temperature may oscillate between low and high values. It is another object to remove hydrogen from pipes and tubes used to transport fluids or gases at elevated temperatures and from incandescent and pressurized lamps. A further object of this invention to provide a novel hydrogen gettering system that has a low vapor pressure at temperatures in excess of 100C. and which will operate in a vacuum, in the presence of atmospheric gases or in the presence of or in contact with water. Yet another object is to provide a hydrogen gettering system which will not form pyrophoric or explosive materials upon exposure to a hydrogen environment. A further object is to provide a hydrogen getter which can be mixed with polymeric materials to make a porous solid not wetted by water yet permeable to hydrogen. These and other objects of the present invention may be achieved by means of an organic hydrogen getter suitable for use at temperatures in excess of 100C., preferably from about 125C. to 200C., which comprises a hydrogenation catalyst mixed with an unsaturated organic component formulated so that it and its hydrogenation products are able to withstand exposure to hydrogen at elevated temperatures without melting or decomposing.

Organic getter systems utilizing a catalyst to add hydrogen to a carbon-carbon double or triple bond were first disclosed by Anderson et al. in U.S. Pat. Nos. 3,896,042 and 3,963,826, incorporated herein by reference. However, these prior art unsaturated precursor compounds and their hydrogenated reaction products generally melt at temperatures below about 100C.; the preferred operating range being 50–80C. When melting occurs organic getter materials cease to function effectively. The surface area decreases resulting in a precipitous decrease in the rate of hydrogen uptake. Furthermore, these getter compounds will crosslink and char at elevated temperatures severely degrading their effectiveness. In order to function properly at the elevated temperatures that may be encountered, for example, while transporting steam or high temperature liquids or in the operating environment of a lamp, the organic reactant and its reaction product must be chosen such that neither will be liquid nor volatile at temperatures to which they may be exposed; temperatures which may be in excess of 100C. In the case of tubulars, the liquid formed by melting of the organic materials can bridge the annular space between the inner and outer tubulars creating a region of increased thermal conductivity and reducing the insulative properties of the vacuum annulus.

The invention disclosed herein overcomes these problems by combining an acetylenic compound having a high melting point, preferably containing at least one phenylethynyl group, with a catalyst in a stable binder to form a hydrogen getter such that the acetylenic reactant and its fully hydrogenated product remain solid at temperatures above 100C. The hydrogen getter compounds disclosed herein have the added advantage that while they are designed to operate at temperatures in excess of 100C. they will also function effectively at lower temperatures. Consequently, they may be employed to remove hydrogen in applications where the temperature may oscillate between low and high temperatures, e.g., from 0C. to 200C. and back.

Organic getter compounds are prepared by intimately mixing an unsaturated organic reactant (alkene or acetylenic) and a suitable catalyst (typically palladium or platinum or their dispersions on an inert support). The getter may be manufactured as a powder or in pelletized form. When used to remove hydrogen from tubulars, the getter must be kept from the walls of the tubular by physical means such as by placing it between layers of insulating cloth in order not to have an adverse effect on the heat transfer characteristics of the annulus. Placing the getter towards the outside of the annulus (near the cooler outer tubular wall) is preferred. The entire arrangement is thoroughly degassed then welded shut so that the vacuum is maintained in the annulus. The tubular is now ready to operate and may be stored in this ready-to-use condition indefinitely. When used in a heat pipe application where the getter will be exposed to water, the getter may be placed in a hydrogen permeable material or pressed with a fluoropolymer powder to make a porous solid which is not wet by water but yet is permeable to hydrogen. In a lamp application it is preferred that the hydrogen getter be placed in a cooler portion of the lamp and in those instances where the lamp operates at very high temperatures, protected by a heat shield.

The objects of the present invention together with additional objects, novel features and advantages thereof over existing prior art forms, which will become apparent to those skilled in the art from detailed disclosure of the present invention as set forth hereinbelow, are accomplished by the improvements herein described and claimed.

E. 4-(9-phenanthrenylethynyl)pyrene.

F. trans-1,2-bis(9-anthracenyl)ethene.

DETAILED DESCRIPTION OF THE INVENTION

Figure 1:
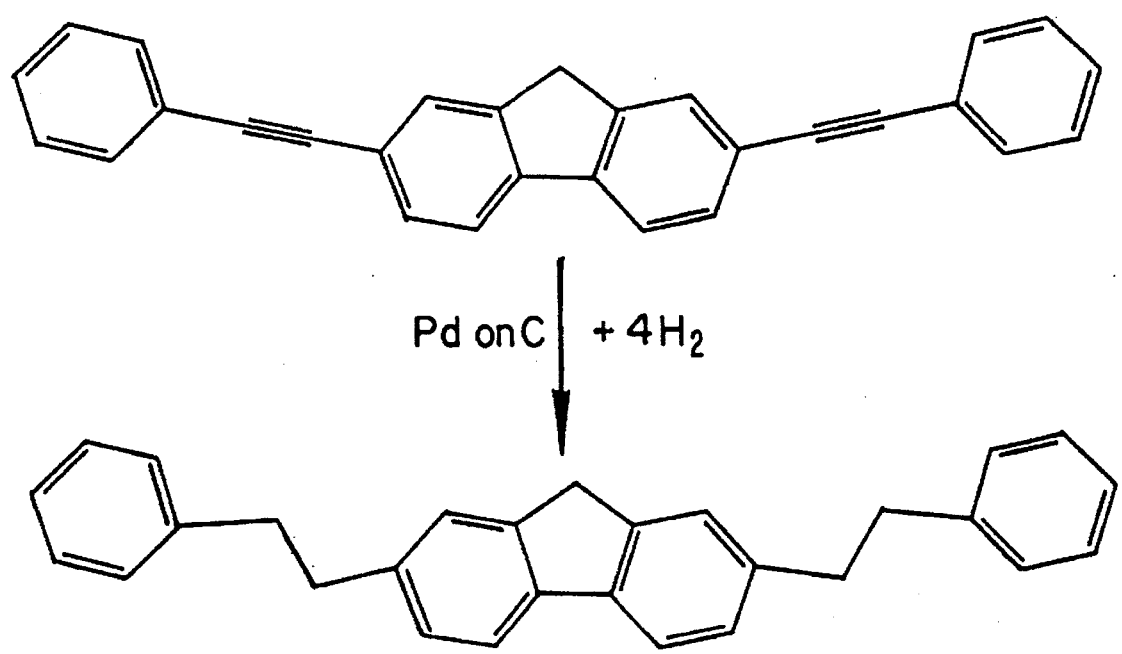
FIG. 1 shows a schematic representation of a hydrogenation reaction in which 2,7-bis(phenylethynyl)fluorene is reduced with hydrogen in the presence of Pd/C catalyst to 2,7-bis(2-phenylethyl)fluorene.

Hydrogenation of a carbon-carbon double or triple bond in an organic compound by means of a catalyst (FIG. 1) is typically, an irreversible, exothermic, heterogeneous reaction. That is, the reaction (the addition of hydrogen to at least one unsaturated carbon-carbon bond) takes place at the boundary between the catalyst and the organic reactant. Consequently, in order to achieve the highest degree of effectiveness the getter materials should preferably be prepared using techniques that ensure that the catalyst is in intimate contact with the active organic compound. The preferred method is to dissolve the organic reactant in an appropriate solvent, such as tetrahydrofuran, adding the catalyst, either as a powder or fixed on an inert substrate such as carbon, diatomaceous earth or asbestos or inorganic minerals or salts, evaporating the solvent and drying the resulting powder. Getter materials may also be prepared by melting the organic compound, mixing an appropriate catalyst with the molten organic material and allowing the mixture to cool. The getter material may then be converted into a powder or some other form appropriate for its ultimate use.

The heterogeneous nature of the hydrogen getter of the present invention causes a distribution of reaction sites that may react at different rates. While in principle, the getter will not stop reacting until all the unstaurated bonds have been hydrogenated, in practice, the rate becomes vanishingly small as the getter approaches saturation. Properly formulated getters will take up >90% of their theoretical capacity of two moles of hydrogen gas for each triple bond in the acetylenic reactant compound within a reasonable period of time.

Because the hydrogenation reaction can be highly exothermic, provision must be made, in some cases, for efficient removal of the heat of reaction from the hydrogen getter materials. Materials such as metal powders, or preferrably excess catalyst, may be added to the getter compound to assist in removing excess heat generated by the hydrogenation reaction. It is preferred that the thermal conductivity of the added material be at least 0.7 Watts/cm-°K.

Where the getter material is exposed to or in contact with water it may be mixed with a binder which is not wetted by water but is permeable to hydrogen, such as a fluoropolymer powder, to make a solid. In some instances the hydrogen getter may be exposed to gases which could adversely affect or poison the hydrogenation catalyst, such as ammonia. In those cases the getter material is preferably encapsulated within a material which is impermeable to the gases which could be detrimental to the proper functioning of the catalyst and yet permeable to hydrogen.

In order to be useful in the removal of hydrogen at elevated temperatures, the acetylenic organic materials which are preferred for use as hydrogen getters as well as their hydrogenation products, must be able to withstand this rigorous environment. Generically these compounds may be represented as $R_x\!\!=\!\!R'_y$, where x and y may be identical and may be at least equal to one and the moieties R and R' may be identical and are aryl or other organic groups as described herein which impart the physical property of high melting or decomposition temperature to the precursor materials and their hydrogenated products. The most effective compounds are those where the moieties R and R' are stable aromatic hydrocarbons such as benzene, styrene, naphthalene, anthracene, biphenyl, fluorene, phenanthrene, pyrene, or an alkyl substituted derivatives or polymers thereof. The moiety R is preferably phenyl making the substituents of R' phenylethynyl as shown below:

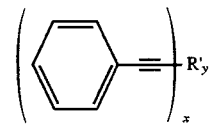

Examples of acetylenic structures which contain the preferred phenylethynyl structure or congeners thereof and which are useful as high temperature hydrogen getters are shown below in FIG. 2. The acetylenic reactant materials can be purchased commercially or synthesized from acetylenes and halogenated aromatics using a procedure such as that described in Havens, S.; Yu, C. C.; Draney, D and Marvel, C. S., J. Sci. Polym. Chem. Ed., 1981, 19, 1349. These reactions usually produce excellent yields (>90%). Compounds that require substitutions on adjacent carbons, i.e., 1,2-dibromoaromatics usually produce lower yields (>30-80%) of the acetylenic product.

As shown in FIG. 2, an aromatic moiety may have multiple phenylethynyl substituents. Structures having multiple phenylethynyl groups typically have greater capacities as measured by the amount of hydrogen that can irreversibly react with each gram of getter. Only triple or double bonds are considered when calculating hydrogen uptake capacity. Aromatic rings usually do not hydrogenate except under extreme conditions of pressure and temperature, however, certain aromatic structures such as anthracene and phenanthrene may be readily partially hydrogenareal. As an example of the different capacities of different molecules, four preferred compounds and their theoretical hydrogen uptake capacities are listed below.

TABLE 1

| Compound | theoretical capacity (std cc $H_2$ $g^{-1}$)* |
|---|---|
| 2-(phenylethynyl)fluorene | 168 |
| 2,7-bis(phenylethynyl)fluorene | 245 |
| 2,4,7-tris(phenylethynyl)fluorene | 288 |
| 2,4,5,7-tetrakis(phenylethynyl)fluorene | 316 |

*The actual capacity would be reduced by the weight percentage of the catalyst in the final formulation.

Structures where carbon-carbon double bonds are substituted for some or all acetylenic carbon-carbon triple bonds are also effective getters, but suffer diminished capacity as a triple bond reacts with twice as much hydrogen as does a double bond.

The requirements for the slurry solvent are that it: dissolve the acetylenic compound, at temperatures below its boiling point, to produce the desired concentration; is inert to the solute and the catalyst; and that it is volatile enough to be vacuum stripped from the slurry in a reasonable period of time.

Many catalysts are effective when combined with the acetylenic compounds to form the getters of this invention. Platinum, palladium and rhodium are the most common catalysts as they function effectively in the presence of a large number of other compounds (most importantly; oxygen, water and carbon dioxide). Palladium, as an example, can be used as a finely divided pure metal or as a dispersion on an inert catalyst such as activated carbon, aluminum oxide, or barium carbonate. As discussed earlier, vide supra, gas-solid getter hydrogenations are heterogeneous reactions, they will only proceed if the acetylenic compounds are intimately mixed with the catalyst. While any process that mixes catalyst and acetylenic compound together (shaking, stirring, grinding, blending, etc.) will make a getter that functions effectively, the useful capacity is proportional to the thoroughness of the mixing process. The preferred process for formulating the getter material is to dissolve the organic reactant in a solvent, add the catalyst to form a slurry, remove the solvent and evaporate to dryness.

Getter formulation requires the proper concentration of catalyst for optimum performance. Extra catalyst will speed the reaction and reduce the capacity. Too little catalyst will increase the capacity of the getter to absorb hydrogen, but may slow the reaction to the point where not all of the capacity will be used. Changing the catalyst or acetylenic compound identity requires careful evaluation of the proper catalyst concentration to optimize reaction rates vs. the capacity needed and the cost of the catalyst in a particular application. Preferably, 0.1–10 weight percent of a catalyst that is 1–5 weight percent noble metal is most effective for a wide variety of different conditions. As discussed earlier, in those instances where the catalyst is also intended to function as a heat sink to mediate rapid exothermic hydrogenation, the catalyst concentration may be raised to higher values (10–75%).

EXAMPLE 1

As an example of getter preparation, 26 g of 4,4'-bis (phenylethynyl)biphenyl is added to 200–300 g of preservative-free tetrahydrofuran that has been passed over neutral alumina to remove potentially explosive peroxides. The catalyst, 1.1 g of 5% Pd on carbon, is added and the three components swirled to make a gray slurry. This slurry is heated with stirring to 50–60C. to dissolve the biphenyl compound. The slurry is then placed on a rotary evaporator where the tetrahydrofuran solvent is removed. Final traces of solvent are removed from the getter using a vacuum oven (<1 tort at 75C.) until the sample has been dried to a constant mass. The getter is a gray powder isolated from this procedure in 100% yield.

The getter material described above was hydrogenated by exposing it to an excess of hydrogen gas at approximately one atmosphere. The initial hydrogenation reaction rate at room temperature was ≈9×10$^{-4}$ std cc H2/s g. At 120C. the initial rate was ≈2×10$^{-2}$ std cc H2/s g.

EXAMPLE 2

A series of hydrogen getters was prepared exactly as in EXAMPLE 1 except that a different solvent was used depending upon the acetylenic compound chosen for the particular getter formulation. The acetylenic compounds and the solvents are useful to dissolve them for subsequent formulation into hydrogen getters are shown below:

| Acetylenic Compound | Solvent |
| --- | --- |
| 2,3,5,6 tetrakis(phenylethynyl)-p-xylene | toluene |
| 1,2,4,5 tetrakis(phenylethynyl) benzene | chloform |
| 2,7-bis(phenylethynyl)fluorenone | acetone |
| 2,7-bis(phenylethynyl)fluorene | methylene chloride |

EXAMPLE 3

As an example of the ability of the getter materials disclosed herein to function effectively when admixed with a fluropolymer to impart water repellancy, 2.4 g 4,4'-bis (phenylethynyl)biphenyl and 0.1 g of catalyst which contained 5% Pd and 2.5 grams of Teflon® powder (DuPont PTFE powder 6C.) were intimately mixed and pressed into a uniform disk (7000 psi, 2 in). A portion of the disk (3.55 g) was submerged in boiling water for about 7 hours, the heat was removed and the disk left in the water for three days. The dripping wet sample was transferred to a reactor which was sealed and pumped out quickly (<1 min.) to about 18 torr overgas pressure; the sample being wet and incompletely degassed at this point. The sample was hydrogenated in the reactor by exposure to a quantity of hydrogen equal to 48% of its theoretical hydrogenation capacity at 1 atm. and about 90C. After eight hours, 99% of the available hydrogen had reacted with the getter material.

Figure 2A:
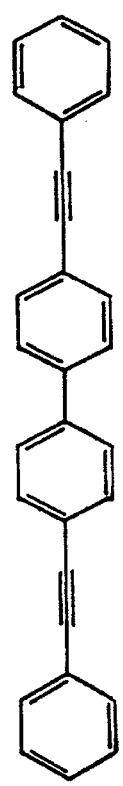
FIG. 2 shows examples of acetylenic compounds useful as reactants in the hydrogenation reactions of FIG. 1:
A:4,4-bis(phenylethynyl)biphenyl,
B:2,7-bis(phenylethynyl)fluorene,
C:2,3,5,6-tetrakis(phenylethynyl)-p-xylene, D. phenylethynyl substituted polystyrene where a, b, and c are ≧0; a+b≧1; and the polymer chain is made up of randomly repeating blocks of ≧0 numbers of each of these subunits in no particular order.
Figure 2B:
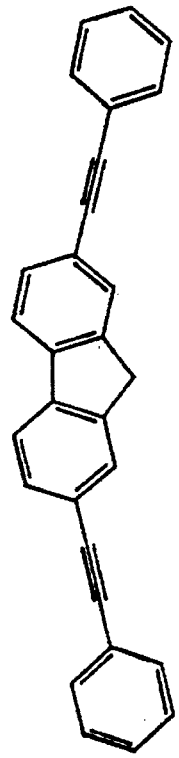
Figure 2C:
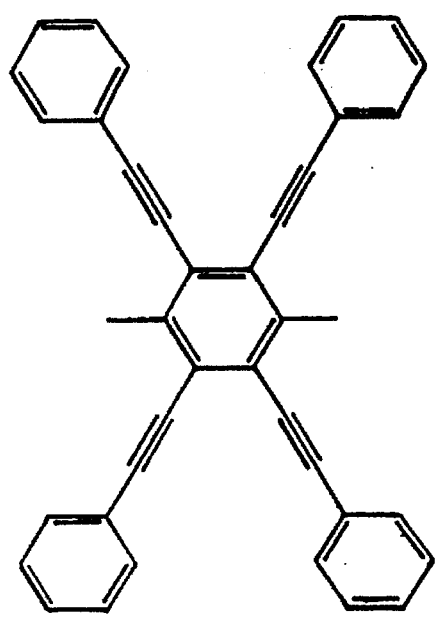
Figure 2E:
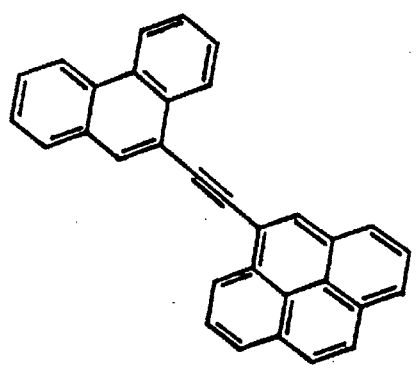
Figure 2D:
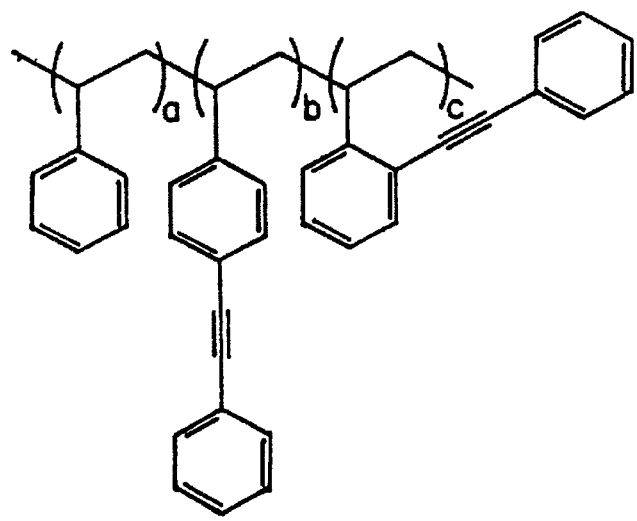
Figure 2F:
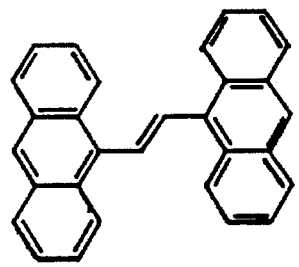

From these examples, it can be seen that the objects of the present invention are fulfilled and those skilled in the art will realize that compounds such as phenylethynyl substituted polystyrene; 4-(9-phenanthrenenylethynyl) pyrene and trans-1,2-bis(9-anthracenyl)ethene, FIGS. 2D, 2E and 2F, can also be used as reactants to accomplish the objects of the present invention.

We claim:
1. A hydrogen getter composition, comprising:
   a) an organic compound, said organic compound having the formula R=R', wherein R and R' are taken from the group consisting of benzene, styrene, naphthalene, anthracene, biphenyl, fluorene, phenanthrene, pyrene, alkyl substituted derivatives, alkenyl substituted derivatives, alkynyl substituted derivatives and polymers thereof; and
   b) a hydrogenation catalyst for catalyzing the reaction between said organic compound and hydrogen and its isotopes.

2. The hydrogen getter of claim 1 wherein said organic compound is 2-(phenylethynyl)fluorene; 2,7-bis (phenylethynyl)fluorenone; 2,7-bis(phenylethynyl)fluorene; 2,4,7-tris(phenylethynyl)fluorene; 2,4,5,7-tetrakis (phenylethynyl)fluorene; 2,3,5,6-tetrakis(phenylethynyl)-p-xylene; 1,2,4,5-tetrakis(phenylethynyl)benzene or 4,4-bis (phenylethynyl)biphenyl and combinations thereof.

3. The hydrogen getter of claim 1 wherein said hydrogen getter is capable of being heated to temperatures of between about 125C. to 200C. without melting or decomposing.

4. The hydrogen getter of claim 1 wherein said organic compound is 4-(9-phenanthrenenylethynyl) pyrene; trans-1, 2-bis(9-anthracenyl)ethene; or phenylethynyl substituted polystyrene and combinations thereof.

5. The hydrogen getter of claim 1 wherein said hydrogenation catalyst is palladium, platinum or rhodium and combinations thereof.

6. The hydrogen getter of claim 5 wherein said catalyst is supported on a porous, inert solid.

7. The hydrogen getter of claim 6 wherein said porous, inert solid is activated carbon, aluminum oxide or barium carbonate and combinations thereof.

8. The hydrogen getter of claim 1 wherein the concentration of hydrogenation catalyst in said getter is from about 0.1 to about 75 weight percent catalyst, wherein said catalyst contains about 1 to 5 weight percent of a metal, based on the weight of said catalyst.

9. The hydrogen getter of claim 1 wherein a material is added to said hydrogen getter to remove excess heat from said getter.

10. The hydrogen getter of claim 9 wherein said material is a metal powder.

11. The hydrogen getter of claim 1, wherein said organic compound consists of an acetylenic organic compound containing at least one phenylethynyl group.

* * * * *